March 15, 1966 R. M. BUCHWALD 3,240,299
VEHICLE CONTROL PEDALS

Filed Jan. 3, 1964 2 Sheets-Sheet 1

INVENTOR.
Robert M. Buchwald
BY
Paul Fitzpatrick
ATTORNEY

March 15, 1966  R. M. BUCHWALD  3,240,299
VEHICLE CONTROL PEDALS

Filed Jan. 3, 1964  2 Sheets-Sheet 2

INVENTOR.
Robert M. Buchwald
BY
Paul Fitzpatrick
ATTORNEY

United States Patent Office 3,240,299
Patented Mar. 15, 1966

3,240,299
VEHICLE CONTROL PEDALS
Robert M. Buchwald, Berkley, Mich., assignor to General Motors Corporation, Detroit, Mich., a corporation of Delaware
Filed Jan. 3, 1964, Ser. No. 335,491
2 Claims. (Cl. 192—3)

This invention relates to vehicle control pedals and more particularly to a pedal console unit combining the brake and accelerator pedals into a single assembly for easier installation in the passenger compartment of a modern automobile.

It is common to have vehicle foot operated control pedals elevated at a considerable height above the floor pan. The accelerator pedal is normally positioned to the right of the brake and clutch pedals and at a much lower level.

With the development of the hydraulic power brake, the differential in height between the accelerator pedal and brake pedal has been reduced. Also to a large extent, the clutch pedal is now a thing of the past in view of the wide use of automatic transmissions. Nevertheless, the braking and accelerating control functions of modern vehicles are still performed from the passenger compartment by separate pedal assemblies. The accelerator pedal normally has a horizontal hinge connection at its base with the floor pan and is attached near its upper end to a throttle control rod passing through an opening in the toe pan area for operation of the carburetor linkages. The brake pedal may be pivoted above or below the toe pan and operatively connected to the power cylinder of the hydraulic brake system.

With the present invention a single brake and accelerator pedal assembly is provided for connection as a unit to the separate braking and accelerator control mechanisms thus eliminating multiple assembly steps in automobile manufacturing.

Another problem connected with present pedal arrangement is that of pedal response. By this we mean the reactive forces opposing pedal depression. In the usual case pedal reactance is determined by the mechanical design of the system and the driver has no opportunity to select a soft or hard pedal feel whichever, is best suited for him.

In this connection, the invention provides a pair of pedals having a common hinging axis in a vertical plane. Due to the vertical hinge arrangement, the operator may change the pedal feel by shifting his foot laterally with respect to the hinging axis. Also, the vehicle brake and accelerator control mechanisms may be operatively connected with the proper pedal at various laterally spaced locations from the hinging axis thus varying the pedal reactance.

A fuller understanding of the invention may be had by reference to the following description and drawings wherein.

Figure 1:
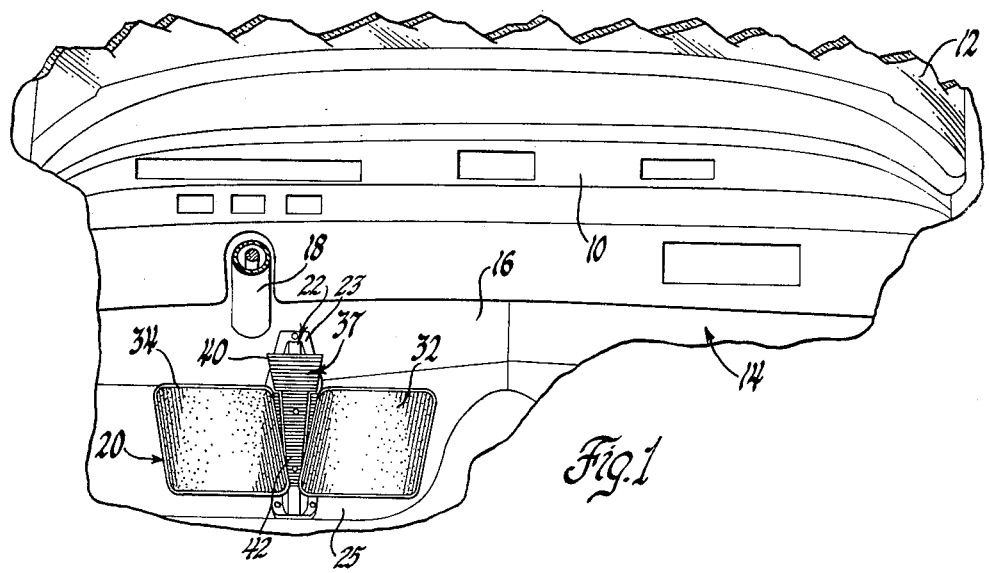
FIGURE 1 is a fragmentary view of an automobile instrument panel and floor board area showing the novel pedal console.

Referring to FIGURE 1, a fragmentary view of a modern automobile interior is shown. The instrument panel 10 is situated below the windshield 12 and spans the front of the passenger compartment 14 above the floor board area 16. The driver's side of the passenger compartment customarily includes a steering wheel mounted on a steering column 18 that extends beyond the fire wall into the engine compartment. Below the steering column and within easy reach of the operator's feet is mounted the inventive pedal console 20.

Figure 2:
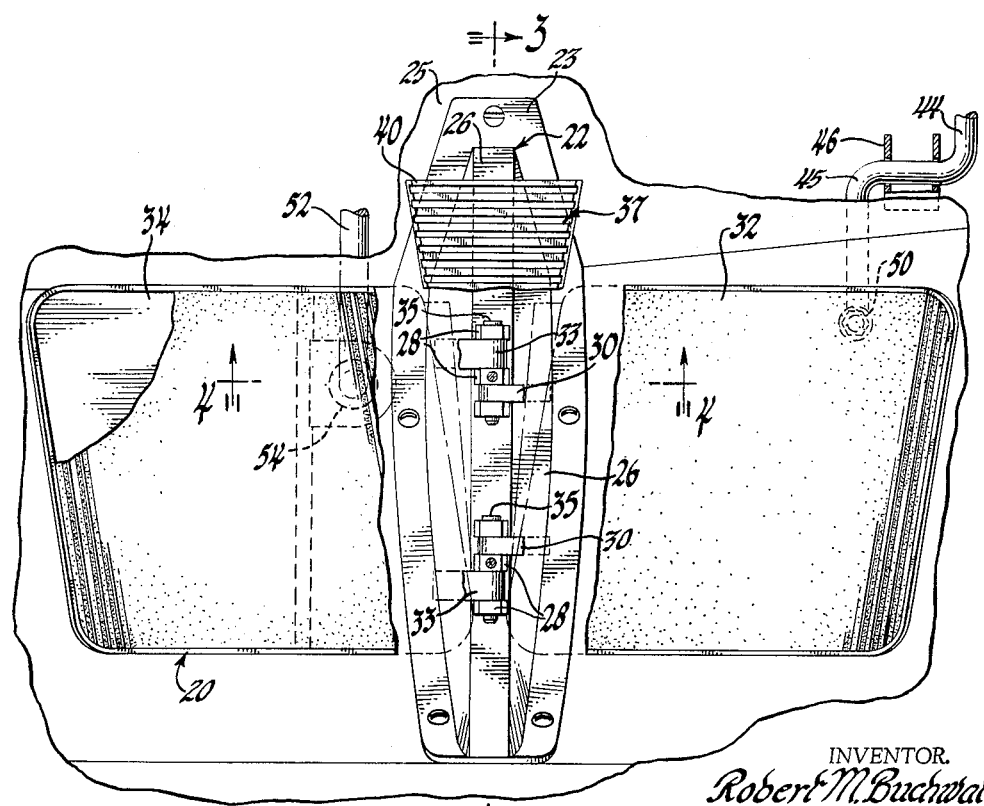
FIGURE 2 is a plan view of the pedal console partially broken away.
Figure 3:
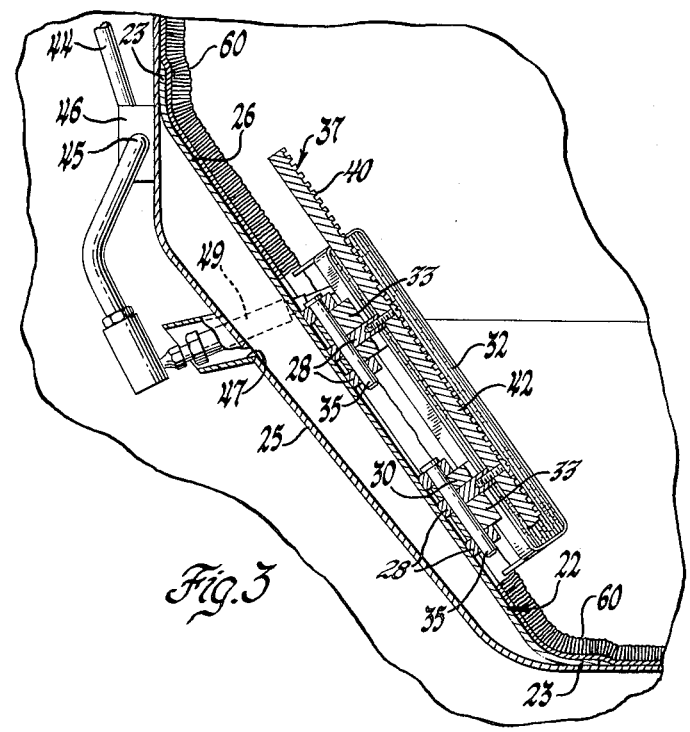
FIGURE 3 is a view of the pedal console taken along line 3—3 of FIGURE 2.
Figure 4:
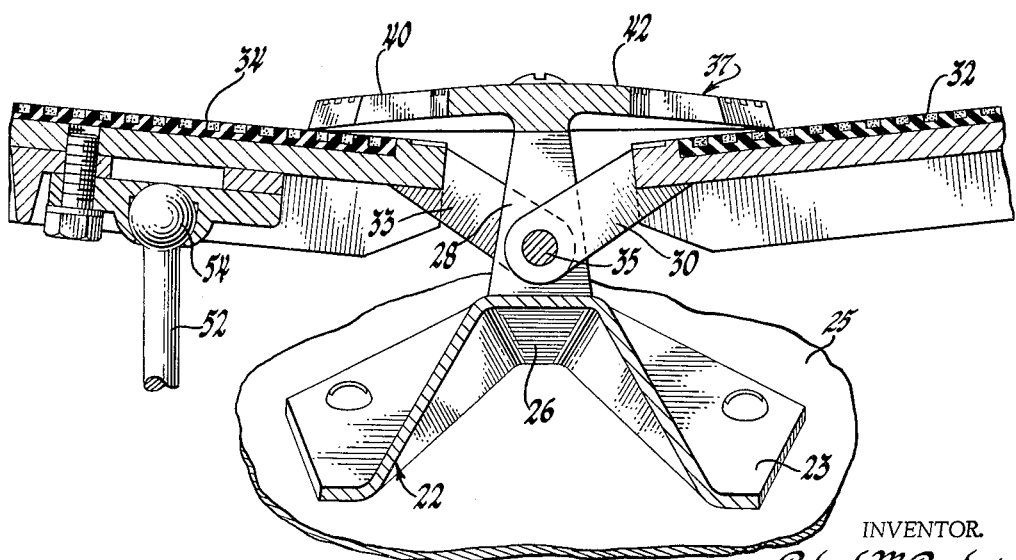
FIGURE 4 is a view of the pedal console taken along line 4—4 of FIGURE 2.

Referring to FIGURES 2, 3, and 4 the pedal console 20 includes a support bracket 22 having a lateral flange portion 23 adapted to fit flush against the toe pan 25. A raised longitudinally extending rib portion 26 on the bracket 22 provides an inclined surface for mounting the pedal hinge. The hinge includes upper and lower sets of hinge pillars 28 secured to the rib portion 26 and axially spaced along the hinging axis to receive the pairs of hinge bosses 30 and 33 on the accelerator pedal 32 and brake pedal 34 respectively. Hinge pins 35 are inserted in aligned holes in the pillars 28 and bosses 30, 33 thus allowing the pedals to swing beneath the operator's foot on opposite sides of a vertical plane containing the hinging axis.

A generally triangular-shaped safety island 37 is positioned between the brake and accelerator pedals to minimize the chance of accidental pedal operation. The safety island is elevated slightly above the inner pedal surfaces and has a wide upper toe area 40 extending beyond the top edge of the pedals and a central divider portion 42 lying between the pedals mounted on the hinge pillars 28 in a suitable fashion.

A throttle control rod 44 has a crank portion 45 supported by a bracket 46 on the engine side of the toe pan. The lower end of the rod 44 is aligned with an opening 47 in the toe pan. A link 49 connects at one end with the lower end of the rod 44 and passes through the opening 47 to connect at 50 on the other end with the undersurface of accelerator pedal 32. The ball and socket connection at 50 is made near the upper right hand corner of the pedal and laterally spaced about three-quarters of the width of the pedal from the hinging axis. A throttle return spring (not shown) biases the throttle control rod to the engine idle position forcing the accelerator pedal into a slightly inclined position as shown in FIGURE 4. This biasing force, and other pedal opposing forces of the system, acts through the connection 50 to exert a force moment about the hinging axis. The magnitude of this force is determined, in part, by the distance the connection 50 is from the hinging axis. Since the connection is widely spaced from the hinging axis, the accelerator pedal reactance will be relatively large. If desired an even harder pedal feel may be obtained by shifting the foot inwardly.

A brake control rod 52, normally controlling a power brake system, operatively connects with the brake pedal 34 through a ball and socket connection 54. This connection is made closer to the hinging axis, therefore the opposing force moment will tend to be less since it has a shorter lever arm. Also, an even softer pedal may be obtained by shifting the foot outwardly.

This vertical hinge arrangement has the advantage, absent from past pedal installations, of providing a soft or hard pedal feel according to which vehicle function is being controlled, braking or acceleration. Normally, a soft brake pedal is desirable, so the braking reactance is reduced by shortening the moment arm in spacing the brake connection closer to the hinging axis. For an even softer pedal, the driver may select a more laterally spaced location to apply the brake pedal pressure. As a result, the brake reactance is overbalanced in the direction of pedal depression giving a softer pedal feel. This approach, when applied to the accelerator pedal, must be varied to take into account a lower reactance force of the system.

It is intended that the carpeting 60 on the floor pan will cover the lower portion of the bracket 22, as shown in FIGURE 3, thus bringing the heel position of the operator's foot level with the bottom of the divider portion 42 of the safety island. Hence, the operator may position his right foot in a central location on the safety island and pivot it on the heel to apply either a brake or accelerator pedal pressure as desired. Of course, the manner of pedal operation is a matter of personal choice. In any case, whichever method is most comfortable for the driver, the pedal response may be changed at any time by laterally shifting the foot with respect to the hinging axis thereby changing the moment arm of the pedal depressing force. Thus, to a large extent the driver may adjust the pedal feel to suit himself while driving.

Having now described the preferred embodiment of the invention in sufficient detail for those skilled in the art to put it in use, it is clear that obvious modifications could be made without deviating from the scope of the appended claims.

I claim:

1. A control pedal unit for a vehicle adapted to be operated by foot pressure and comprising
    a support bracket having a raised rib portion mounted in the toe pan area of the vehicle passenger compartment,
    hinge means on the rib portion providing a generally vertically disposed hinging axis,
    a pair of foot pedals having a common hinge connection with the hinge means to swing about the hinging axis on opposite sides thereof beneath the operator's foot, the pedal depressing force on each pedal being a function of the lateral position of the operator's foot with respect to said hinging axis,
    vehicle operation control means for each pedal being connected to the respective pedals at points laterally spaced from the hinging axis and providing an opposing force moment about the hinging axis to said pedal depressing force, and a centrally located safety island mounted on said rib portion generally in an elevated plane above the pedals to prevent accidental pedal depression.

2. A control pedal console for a vehicle adapted to be operated by foot pressure and comprising
    an elongated support bracket having a raised rib portion mounted in the toe pan area of the vehicle passenger compartment,
    hinge means mounted on the rib portion having a generally vertically disposed hinging axis,
    a pair of generally flat foot pedals each of a substantial width accommodating a plurality of positions of the operator's foot thereon and each being mounted on said hinge means to swing about the hinging axis on opposite sides thereof beneath the operator's foot, the pedal depressing force on each pedal being a function of the lateral position of the operator's foot with respect to said hinging axis,
    vehicle brake control linkage means connected to one of said pedals at a point slightly laterally spaced from the hinging axis providing a range of pedal feel through a choice of brake application positions for the operator's foot varying from a short lever arm position generally opposite said point of connection for hard pedal feel to a long lever arm position remote from said axis and said point of connection for soft pedal feel, and
    vehicle accelerator control linkage means connected to said other pedal at a point of remote lateral spacing from the hinging axis providing a range of pedal feel through a choice of accelerator application positions for the operator's foot varying from a long lever arm position generally opposite said point of connection for soft pedal feel to a short lever arm position adjacent said axis and remote from said point of connection for hard pedal feel.

References Cited by the Examiner

UNITED STATES PATENTS

| | | | |
|---|---|---|---|
| 1,505,949 | 8/1924 | Down | 192—1 |
| 1,923,173 | 8/1933 | Stewart et al. | 192—1 |

DAVID J. WILLIAMOWSKY, *Primary Examiner.*